(12) United States Patent
Schateikis et al.

(10) Patent No.: US 7,451,584 B2
(45) Date of Patent: Nov. 18, 2008

(54) OBJECT DISTRIBUTION DEVICE, PACKAGING DEVICE AND OBJECT DISTRIBUTION PROCESS

(75) Inventors: Dieter Schateikis, Stolberg (DE); Manfred Reiser, Winnenden (DE)

(73) Assignees: Gruenenthal GmbH, Aachen (DE); Harro Hoefliger Verpackungsmaschihinen GmbH, Allmersbach, I. T. (DE)

( * ) Notice: Subject to any disclaimer, the term of this patent is extended or adjusted under 35 U.S.C. 154(b) by 0 days.

(21) Appl. No.: 11/851,588

(22) Filed: Sep. 7, 2007

(65) Prior Publication Data

US 2008/0060322 A1   Mar. 13, 2008

Related U.S. Application Data

(63) Continuation of application No. PCT/EP2006/060594, filed on Mar. 9, 2006.

(30) Foreign Application Priority Data

Mar. 11, 2005   (DE) .................... 10 2005 011 743

(51) Int. Cl.
  *B65B 21/06*   (2006.01)
(52) U.S. Cl. .............................. 53/443; 53/448; 53/147; 53/149; 53/543

(58) Field of Classification Search ................... 53/443, 53/448, 147, 149, 150, 543
See application file for complete search history.

(56) References Cited

U.S. PATENT DOCUMENTS

| | | | | |
|---|---|---|---|---|
| 3,490,761 A | * | 1/1970 | Bell | 270/52.02 |
| 3,652,078 A | * | 3/1972 | Sather et al. | 270/52.06 |
| 3,819,173 A | * | 6/1974 | Anderson et al. | 270/52.04 |
| 4,707,790 A | * | 11/1987 | Gomes et al. | 700/222 |
| 5,067,088 A | * | 11/1991 | Schneiderhan | 700/221 |
| 5,177,687 A | * | 1/1993 | Baggarly et al. | 705/406 |
| 7,171,796 B2 | * | 2/2007 | Spirito et al. | 53/444 |
| 2002/0069618 A1 | * | 6/2002 | Otsuka et al. | 53/434 |

OTHER PUBLICATIONS

PCT/IB/338, PCT/IB/373 and PCT/ISA/237 (Seven (7) pages).

* cited by examiner

*Primary Examiner*—Hemant M Desai
(74) *Attorney, Agent, or Firm*—Crowell & Moring LLP

(57) ABSTRACT

A distributing device and a method for distributing objects from a supplying device. Said distributing device being configured to deliver the objects during a delivery clock pulse in groups of m objects, to a first receiving device and to a second receiving device, said receiving devices jointly receiving the group of m objects during a reception clock pulse, and the m objects of a group being variably divided, between different reception clock pulses, into a first number $m_1$ of objects delivered to the first receiving device and a second number $m_2$ of objects delivered to the second receiving device.

20 Claims, 2 Drawing Sheets

OBJECT DISTRIBUTION DEVICE, PACKAGING DEVICE AND OBJECT DISTRIBUTION PROCESS

CROSS-REFERENCE TO RELATED APPLICATIONS

This application is a continuation of International Patent Application No. PCT/EP2006/060594 filed Mar. 9, 2006 which claims benefit to German patent Application No. 10 2005 011 743.0 filed Mar. 11, 2005, the entire disclosures of which are hereby incorporated by reference in their entirety.

FIELD OF THE INVENTION

The invention relates to a distributing device for distributing objects from a supplying device, which delivers the objects during a delivery clock pulse in groups of m objects to a first receiving device and to a second receiving device.

BACKGROUND OF THE INVENTION

In the production of pharmaceutical products, it is necessary to be able to produce different package sizes at low cost. This applies particularly to those pharmaceutical products in which individual doses of a drug have to be packed, for example, with, or in, a drinking straw. To achieve this end, it is necessary to adapt the entire packaging system in an easy and simple way to the production of different package sizes, i.e. to reduce the steps required to effect a changeover.

In general, devices for distributing products are well known. Usually, a supplying device, for example, a supply belt (in the form of an endless belt) and a discharge device, for example a discharge belt (in the form of an endless belt) are provided, a distributing belt being disposed between the supply belt and the discharge belt, which distributing belt can be caused to move, for example, transversely to its conveying direction.

The disadvantage of distributing devices disclosed in the prior art is that the corresponding packaging machines do not have the required flexibility for easy and simple production of differently dimensioned cartons or differently dimensioned units of packaged pharmaceutical products or that the steps involved in effecting a changeover from one package size to another are relatively elaborate.

SUMMARY OF THE INVENTION

One object of certain embodiments of the invention is to provide a device for distributing objects which does not suffer from the disadvantages of the prior distributing devices and can be provided cost-effectively and requires little space.

This object is achieved according to the invention by a distributing device that distributes objects from a supplying device, which delivers the objects during a delivery clock pulse in groups of m objects, to a first receiving device and to a second receiving device, said receiving devices jointly receiving the group of m objects during a reception clock pulse, and the m objects of a group being variably divided, between different reception clock pulses, into a first number $m_1$ of objects delivered to the first receiving device and a second number $m_2$ of objects delivered to the second receiving device. This makes it possible, advantageously, according to the invention, to produce different successive carton sizes involving different numbers of objects, while it is possible to change the carton size or, generally speaking, the package size with least possible complication and in very short changeover times. Thus the invention makes it possible, for example, to consecutively produce pharmaceutical products having package sizes that are suitable for hospitals and package sizes intended for delivery to the end user, with very small, or no, effort being required for a changeover, and largely without any increase in the costs or delay involved by a changeover.

Furthermore, each of the receiving devices forms packets of p objects during a reception cycle consisting of N reception clock pulses, where the number of the packets formed is equal to the product of the number of receiving devices and the number m of the objects in a group. It is likewise preferable if the number N of reception clock pulses in a reception cycle is equal to the product of the number of receiving devices and the number p of objects in a packet. It is thus possible, using simple means, to form a certain number of packets of a uniform size after a complete reception cycle, and, if appropriate, to subsequently effect a change in the size of the packet in spite of the delivery of a variable number of objects during each reception clock pulse to the first or second receiving device.

It is further preferable if during one and the same reception clock pulse, the first number $m_1$ of objects delivered to the first receiving device differs from the second number $m_2$ of objects delivered to the second receiving device by not more than 1 to 3, preferably by not more than 1. It is thus possible, advantageously, for the individual objects to be exposed to only very low acceleration forces during distribution to the first or second receiving device. In this way it is also possible, advantageously, to design the distributing device in a particularly space-saving manner. The greater the allowable difference between the first and second numbers $m_1$, $m_2$, the greater the possibility of varying the different carton sizes or package sizes which can be produced using the distributing device according to the invention.

Furthermore, according to the invention, the distributing device further preferably comprises a transfer device, by means of which the objects move along a transferring direction from the supplying device to the receiving devices, and also along a direction of distribution running substantially transversely to the conveying direction. It is thus possible, according to the invention, to prevent the objects from being subjected to any unnecessary acceleration forces, as would be the case, for example, with rotary motion or the like.

It is further preferable according to the invention if the number p of objects of a packet is equal to a number ranging from five to fifty, preferably twelve, fourteen, sixteen or eighteen. In this way, the invention makes it easy to produce conventional package sizes, for example, small package sizes for delivery to the end user or large package sizes, for example, as are suitable for hospitals.

Another object of the present invention is a packaging device for forming object packages using a distributing device of the invention, where the number p of objects in a package is equal to the number of objects in an object package. A packaging device of such type comprises, for example, a first device, which packages each pharmaceutical product individually and transports the pharmaceutical products, thus packaged, as objects to a transfer station as a supplying device, and further a second device which packs packets of such objects into cartons or package units such that they are ready for dispatch. The distributing device of the invention is disposed between the first and the second device and it transfers the objects from an interface assigned to the first device in the form of a supplying device to the receiving devices, which are likewise assigned to the second device as interfaces. While the type of the first device or the second device is irrelevant according to the invention, the decisive factor is that the first device comprises a supplying device as a transfer interface, and the second device likewise comprises a first and a second receiving device as interfaces.

The present invention further relates to a method for distributing objects from a supplying device, which delivers the objects during a delivery clock pulse in groups of m objects to a first receiving device and to a second receiving device, the receiving devices jointly receiving the group of m objects during a reception clock pulse, and the m objects of a group being divided variably between different reception clock pulses into a first number $m_1$ of objects supplied to the first receiving device and a second number $m_2$ of objects supplied to the second receiving device. The advantage of such a method is that it enables the receiving device to form packets of the objects using simple means in a very variable manner and involving an easy changeover.

Furthermore, during a reception cycle consisting of N reception clock pulses, packets of p objects are preferably formed, where the number of packets formed is equal to the product of the number of receiving devices and the number m of objects in a group. It is likewise preferable if the number N of reception clock pulses in a reception cycle is equal to the product of the number of receiving devices and the number p of objects in a packet. It is thus possible, advantageously, according to the invention, to form packets having a different number of objects in a packet at the end of such a reception cycle. This can be implemented, according to the invention, using very little effort.

It is further preferable, according to the invention, if, during one and the same reception clock pulse, the first number $m_1$ of objects delivered to the first receiving device differs from the second number $m_2$ of objects delivered to the second receiving device by not more than one to three, preferably by not more than one. This enables the distributing device of the invention to be set up or implemented in a space-saving, and thus cost-effective, manner.

It is further preferable if the number p of objects in a packet is equal to a number ranging from five to fifty, preferably twelve, fourteen, sixteen or eighteen. This enables a very flexible production of packages by means of the method of the invention.

Furthermore, the number m of objects in a group is preferably equal to a number ranging from two to twenty, preferably five, six, eight or ten. It is thus possible to use the method of the invention in a plurality of distributing processes particularly for packaging objects in different distributing units.

BRIEF DESCRIPTION OF THE DRAWINGS

The invention will be described below in more detail with reference to the exemplary embodiments shown in the drawings, in which.

DETAILED DESCRIPTION OF PREFERRED EMBODIMENTS

For simplicity and illustrative purposes, the principles of the present invention are described by referring to various examples. One of ordinary skill in the art will readily recognize that the same principles are equally applicable to, and can be implemented in other forms, and that any such variation would be within those modifications that do not part from the true spirit and scope of the present invention. The invention is not limited in its application to the details of any particular formulation shown, since the invention is capable of other embodiments. The following examples are provided for illustrative purposes and do not and should not be understood to limit the claims appended hereto. The terminology used herein is for the purpose of description and not of limitation.

Figure 1:
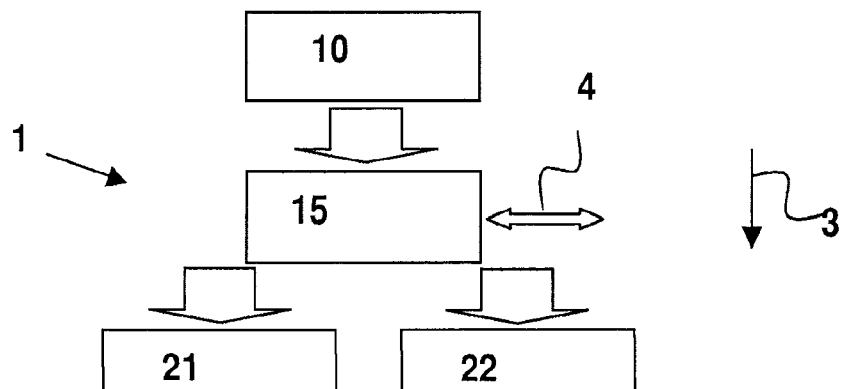
FIG. 1 is a basic diagram of a distributing device of the invention.

FIG. 1 schematically shows a distributing device 1 of the invention. The distributing device 1 comprises a transfer device 15, which is able to move objects (not shown in FIG. 1) from a supplying device 10 to a first receiving device 21 and to a second receiving device 22 in a transferring direction 3 for the objects. When the objects are distributed to the first or the second receiving device 21, 22 as shown by way of example in FIG. 1, the transfer device 15 moves in a distributing direction 4 that runs substantially transversely to the conveying direction 3. In general, the distributing device 1 of the invention is part of a larger packaging device, which is not shown in its entirety and which contains a first device (not shown) and a second device (not shown), the supplying device 10 forming the interface between the first device of the packaging device and the distributing device 1, and the first and second receiving devices 21, 22 likewise forming the interface between the second device of the packaging device and the distributing device 1 of the invention.

Figure 2:
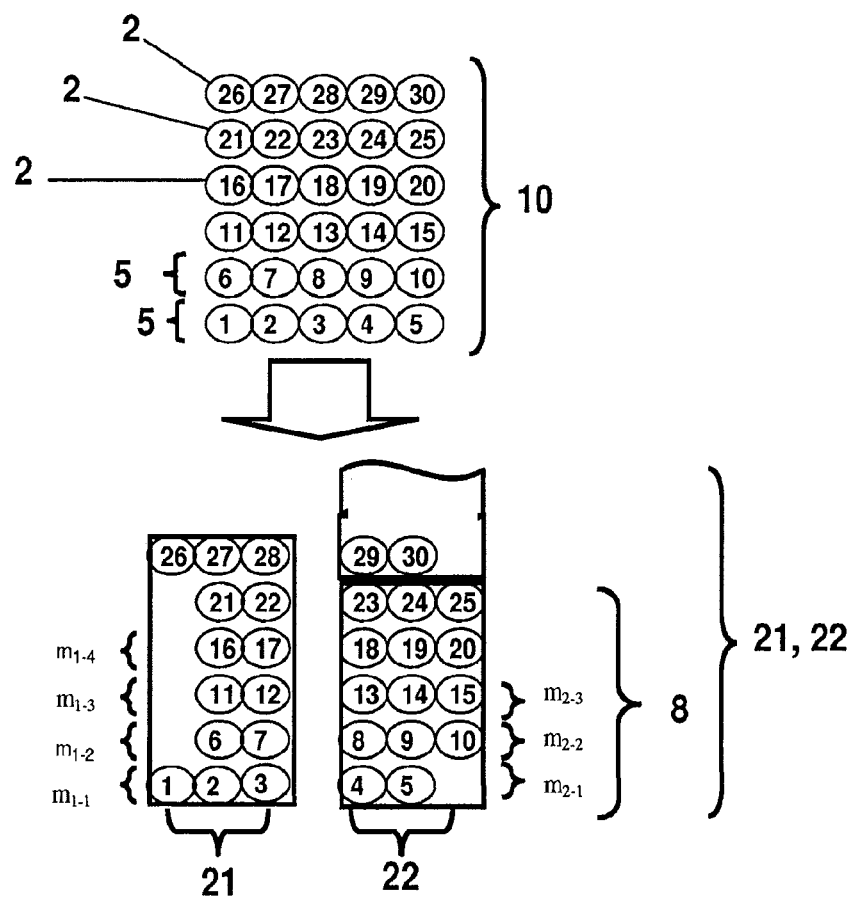
FIG. 2 is a basic diagram for illustrating the mode of operation of the distributing device of the invention and for illustrating the method of the invention.

FIG. 2 shows the mode of operation of the distributing device 1 of the invention or the method of the invention for distributing objects. A plurality of objects 2, as provided to the supplying device 10 for transferring them to the receiving devices 21, 22, is shown in the upper part of FIG. 2. The objects 2 shown in FIG. 2 are numbered serially from 1-30 in order to better illustrate the chronological sequence of the mode of operation of the distributing device and the chronological sequence of the execution of the method of the invention. The objects 2 are delivered to the supplying device 10 per clock pulses in defined groups 5 and the objects 2 are thus available for delivery to the receiving devices 21, 22. Every such group 5 of objects 2 comprises a defined number m of objects 2. For example, a group 5 comprises exactly five objects 2. However, a group 5 of objects 2 may also comprise numbers ranging from two to about twenty objects 2, the preferred numbers of objects 2 within a group 5 being five, six, eight, or ten. The distribution of the objects 2 received by the first and second receiving devices 21, 22 is illustrated in the lower part of FIG. 2. It follows clearly from the serial numbering of the objects 2 that the objects 2 (amounting to five in this example) of a group (m=5) are distributed differently in different reception clock pulses. This can be explained as follows:

During a first reception clock pulse, the receiving devices 21, 22 receive the objects 2 numbered serially with the digits 1 to 5. During a second reception clock pulse, the receiving devices 21, 22 receive the objects 2 numbered serially with the digits 6-10. During a sixth reception clock pulse, the receiving devices 21, 22 receive the objects 2 numbered serially with the digits 26-30. If the number m of objects 2 within a group 5 were greater or less than five, naturally the numbers of the serially numbered objects 2 would change. The arrangement is such that the first receiving device 21 receives three objects 2 during the first reception clock pulse, two objects 2 during each of the second to fifth reception clock pulses and again three objects 2 during the sixth reception clock pulse. The second receiving device 22 receives two objects 2 during the first reception clock pulse, three objects 2 during each of the second to fifth reception clock pulses each and again two objects 2 during the sixth reception clock pulse. For each reception clock pulse, there is thus a first number $m_1$ of objects 2 which are received by the first receiving device 21, and a second number $m_2$ of objects 2, which are received by the second receiving device 22. It holds true for each reception clock pulse that the sum of the first number $m_1$ and the second number $m_2$ is equal to the number m of objects 2 within a group 5. That is, during each reception clock pulse, all of the objects 2 of a group 5 provided by the supplying device 10 are completely distributed to the receiving devices 21, 22. For better clarification of the sequence of events involved in the method of the invention, FIG. 2 designates the first number for the first reception clock pulse as $m_{1\text{-}1}$, and the second number for the second reception clock pulse as $m_{1\text{-}2}$ and so forth. The first number $m_{1\text{-}6}$ designates the objects 2 supplied to the first receiving device 21 during the sixth reception clock pulse. Similarly, the second number is defined as $m_2$ for each of the reception clock pulse, giving $m_{2\text{-}1}$ for the first reception cycle, $m_{2\text{-}2}$ for the second reception cycle, and so on.

It further follows clearly from FIG. 2 that after a fixed number of supplied objects, packets are formed by combining a preset number of objects 2 to form a packet 8. In the example shown in FIG. 2, this number is equal to fourteen objects 2 within a packet 8. The number of objects 2 within a packet 8 is also designated below by the letter "p". The first number $m_1$ may differ from the second number $m_2$, for every reception cycle, by not more than 1 in the present example: the group 5 comprising five objects 2 is divided into a first number $m_1$ of two or three objects 2 and a second number $m_2$ of three or two objects 2 respectively. It is also possible, according to the invention, for the first and second numbers $m_1$, $m_2$ to differ from each other by more than one, for example, by two (if m is an even number) or three, so that a distribution ratio of 4:1 or 1:4 (in the case of a number of five objects 2 within a group 5) is also possible. This allows for more possibilities for varying the size of the packet formed. However, this suffers from the drawback that a stronger lateral movement, i.e. usually in the distributing direction 4 of the transfer device 15, is required, thereby increasing the space required and increasing the acceleration forces acting on the objects 2 during distribution to the first or second receiving device 21, 22 under otherwise equal conditions (particularly equally timed clock pulses).

Figures 3, 4:
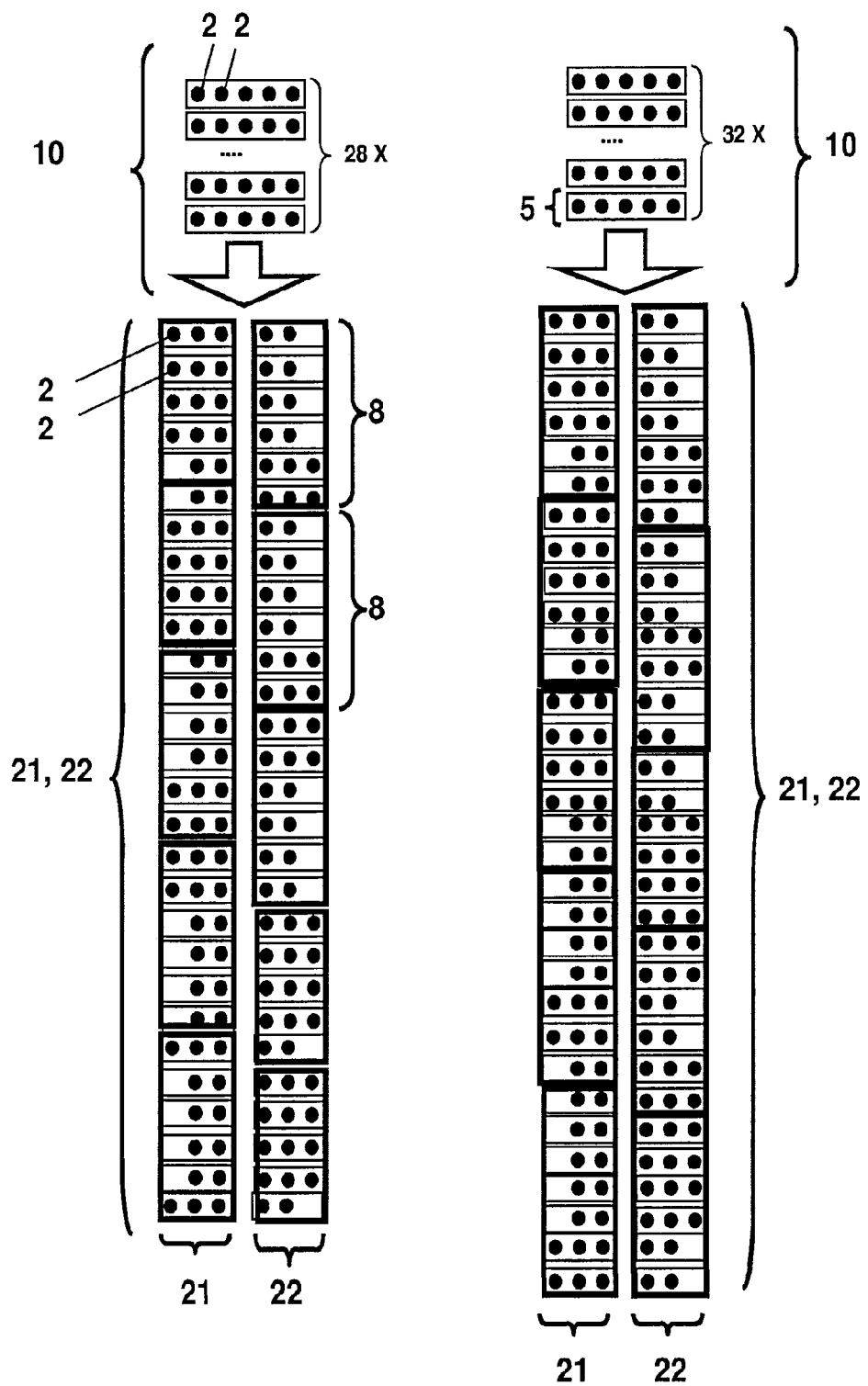
FIGS. 3 and 4 each show different exemplary embodiments of the mode of operation of the distributing device of the invention and of execution of the method of the invention.

FIGS. 3 and 4 illustrate by way of example the mode of operation of the distributing device 1 of the invention or the method of the invention for distributing objects 2 with reference to a complete reception cycle. For the sake of simplicity, the objects 2 are no longer numbered serially in FIGS. 3 and 4, but are instead only represented by solid circles.

FIG. 3 illustrates by way of example the method of the invention for forming packets 8 having fourteen objects 2 (i.e. p=14) each. A number of m=5 objects 2 within a group 5 results in a length N of the reception cycle of 28 delivery clock pulses or reception clock pulses of the distributing device 1. The packets are formed in such a way that after a specific reception clock pulse, for example the fifth reception clock pulse, a packet 8 is already completely formed at the second reception device 22, while the first receiving device 21 still requires the sixth reception clock pulse to complete the formation of the package 8 (cf FIG. 2).

FIG. 4 illustrates the reception cycle consisting of N=32 reception clock pulses of packets having p=16 objects 2 each. For the example of five objects 2 within a group 5 and a maximum difference of the first number $m_1$ from the second number $m_2$ of one, it is possible to form different packet sizes, for example, ten, twelve, fourteen, or sixteen. However, several other packet sizes, for example, a packet size of thirteen, are not possible with this basic configuration. However, a packet size of thirteen is possible if greater variability of the first number $m_1$ from the second number $m_2$ is permitted, for example, a difference of three objects 2.

LIST OF REFERENCE NUMERALS OR CHARACTERS 1 distributing device
2 objects
3 conveying direction
4 distributing direction
5 group
8 packet
10 supplying device
15 transfer device
21 first receiving device
22 second receiving device
m number of objects in a group
p number of objects in a packet
$m_1$ first number
$m_2$ second number
N number of reception clock pulses in a reception cycle The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A distributing device for distributing objects comprising:
   a supplying device configured to deliver the objects in groups of m objects during a delivery clock pulse to a first receiving device and to a second receiving device;
   a first receiving device and a second receiving device, wherein said first receiving device and second receiving device are configured to jointly receive the group of m objects during a reception clock pulse, and
   said distributing device is configured such that, between different reception clock pulses, the m objects in said group are divided into a first number $m_1$ of objects delivered to said first receiving device and a second number $m_2$ of objects delivered to the second receiving device.

2. The distributing device according to claim 1, wherein each of said first receiving device and second receiving device is configured to form packets of p objects during one reception cycle consisting of N reception clock pulses in each case, the number of packets formed being equal to the product of the number of said receiving devices and the number m of objects in a group.

3. The distributing device according to claim 2, wherein said device is configured so that the number N of reception clock pulses of a reception cycle is equal to the product of the number of said receiving devices and the number p of objects in a packet.

4. The distributing device according to claim 1, wherein said device is configured so that during one reception clock pulse, the first number $m_1$ of objects delivered to said first receiving device and the second number $m_2$ of objects delivered to said second receiving device differ by not more than three.

5. The distributing device according to claim 1, wherein said device is configured so that during one reception clock pulse, the first number $m_1$ of objects delivered to said first receiving device and the second number $m_2$ of objects delivered to said second receiving device differ by not more than one.

6. The distributing device according to claim 1, further comprising a transfer device configured to move both in a conveying direction of said supplying device toward said first receiving device and second receiving device and in a distributing direction of distribution which is substantially perpindicular to said conveying direction.

7. The distributing device according to claim 2, wherein said number p of objects in a packet is equal to a number ranging from five to fifty.

8. The distributing device according to claim 2, wherein said number p of objects in a packet is equal to twelve, fourteen, sixteen or eighteen.

9. The distributing device according to claim 1, wherein said number m of said objects in a group is equal to a number ranging from two to twenty.

10. The distributing device according to claim 1, wherein said number m of said objects in a group is equal to five, six, eight or ten.

11. A packaging device for producing packages of objects using a distributing device as set forth in claim 2, wherein the number p of objects in a packet is equal to the number of objects in a package of objects.

12. A method for distributing objects comprising the steps of:

distributing objects from a supplying device delivering the objects in groups of m objects during a delivery clock pulse to a first receiving device and to a second receiving device, wherein said first receiving device and second receiving device jointly receive the group of m objects during a reception clock pulse, and dividing the m objects in said group into a first number $m_1$ of objects delivered to said first receiving device and a second number $m_2$ of objects delivered to the second receiving device between different reception clock pulses.

13. The method according to claim 12, wherein during one reception cycle consisting of N reception clock pulses packets containing p objects are formed, the number of packets formed being equal to the product of the number of receiving devices and the number m of objects in a group.

14. The method according to claim 13, wherein the number N of reception clock pulses in a reception cycle is equal to the product of the number of receiving devices and the number p of objects in a packet.

15. The method according to claim 12, wherein during one and the same reception clock pulse, the first number $m_1$ of objects delivered to said first receiving device and the second number $m_2$ of objects delivered to said second receiving device differ by not more than three.

16. The method according to claim 12, wherein during one and the same reception clock pulse, the first number $m_1$ of objects delivered to said first receiving device and the second number $m_2$ of objects delivered to said second receiving device differ by not more than one.

17. The method according to claim 12, wherein said number p of said objects in a packet is equal to a number ranging from five to fifty.

18. The method according to claim 12, wherein said number p of said objects in a packet is equal to twelve, fourteen, sixteen or eighteen.

19. The method according to claim 12, wherein said number m of said objects in a group is equal to a number ranging from two to twenty.

20. The method according to claim 12, wherein said number m of said objects in a group is equal to five, six, eight or ten.

* * * * *